United States Patent
Earnshaw et al.

(10) Patent No.: US 8,326,109 B2
(45) Date of Patent: Dec. 4, 2012

(54) LOW-COST FAST VARIABLE OPTICAL ATTENUATOR FOR OPTICAL WAVELENGTH TRACKING

(75) Inventors: Mark P. Earnshaw, Morristown, NJ (US); Mahmoud S. Rasras, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 290 days.

(21) Appl. No.: 12/639,525

(22) Filed: Dec. 16, 2009

(65) Prior Publication Data
US 2011/0142393 A1 Jun. 16, 2011

(51) Int. Cl.
*G02B 6/00* (2006.01)
(52) U.S. Cl. .............. 385/140; 385/14; 385/15; 385/31; 385/33; 385/134

(58) Field of Classification Search .............. 385/14, 385/15, 31, 33, 134, 140
See application file for complete search history.

(56) References Cited

U.S. PATENT DOCUMENTS

| | | | |
|---|---|---|---|
| 6,522,800 B2 * | 2/2003 | Lucero | 385/16 |
| 6,801,679 B2 * | 10/2004 | Koh et al. | 385/14 |
| 2010/0060970 A1 * | 3/2010 | Chen | 359/245 |
| 2011/0091146 A1 * | 4/2011 | Knights et al. | 385/2 |

\* cited by examiner

*Primary Examiner* — Jennifer Doan
(74) *Attorney, Agent, or Firm* — Wall & Tong, LLP (57) ABSTRACT

Variable optical attenuator (VOA) formed by disposing upon a substrate a waveguide, a p-type region and an n-type region about the waveguide, and an epi-silicon region disposed upon the waveguide, the VOA responsive to a bias current to controllably inject carriers into the waveguide to attenuate thereby optical signal propagating through the waveguide.

23 Claims, 5 Drawing Sheets

LOW-COST FAST VARIABLE OPTICAL ATTENUATOR FOR OPTICAL WAVELENGTH TRACKING

FIELD OF THE INVENTION

The invention relates to optical communications and, more particularly, to variable optical attenuators (VOAs).

BACKGROUND

Transparent optical communications systems use variable optical attenuators (VOA) for each wavelength channel to impose a relatively low frequency dither tone which is below the data channel in frequency and can be used to identify channels and their power levels in transmission. This VOA must be both sufficiently fast (e.g., 1 MHz), physically small and low cost, especially for applications with over 50 wavelengths in each system.

Some optical communications systems use bulk-silicon ridge waveguide VOAs, which are fast enough in attenuation response and relatively small. However, silicon waveguide VOAs use conventional fibre v-groove blocks to attach fibres on each side. These fibres are both large and costly relative to the size and cost of the silicon waveguide VOA chip. For reference, for optical splitters and arrayed-waveguide grating filters (both of which are high volume integrated waveguide devices), the integrated optical die tends to be less expensive than the fibre assembly used to attached the die to the fibres.

Another issue with silicon waveguide VOAs the use of a low-contrast waveguide design, which increases both the chip area (leading to lower wafer yield and higher cost) and requires fibre to be attached to both sides of the VOA (which increases the overall size of the component).

SUMMARY

Various deficiencies of the prior art are addressed by a variable optical attenuator (VOA) formed by disposing upon a substrate a waveguide, a p-type region and an n-type region about the waveguide, and an epi-silicon region disposed upon the waveguide, the VOA responsive to a bias current to controllably inject carriers into the waveguide to attenuate thereby optical signal propagating through the waveguide.

One embodiment is an apparatus comprising a substrate, having disposed thereon a waveguide; an epi-silicon region disposed upon the waveguide; and a variable optical attenuator (VOA) comprising a p-type region and an n-type region, the VOA disposed about the waveguide and responsive to a bias current to controllably inject carriers into the waveguide to attenuate thereby optical signal propagating through the waveguide.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Various embodiments will be discussed within the context of a highly confined silicon waveguide design including one or more integrated coupling lenses, the design enabling a significant reduction in overall packaging costs and size, as well as a higher wafer yield and so further cost reduction.

Various embodiments provide a tunable optical phase shifter that supports both TE and TM polarizations i.e., exhibits polarization insensitivity.

Figure 1:
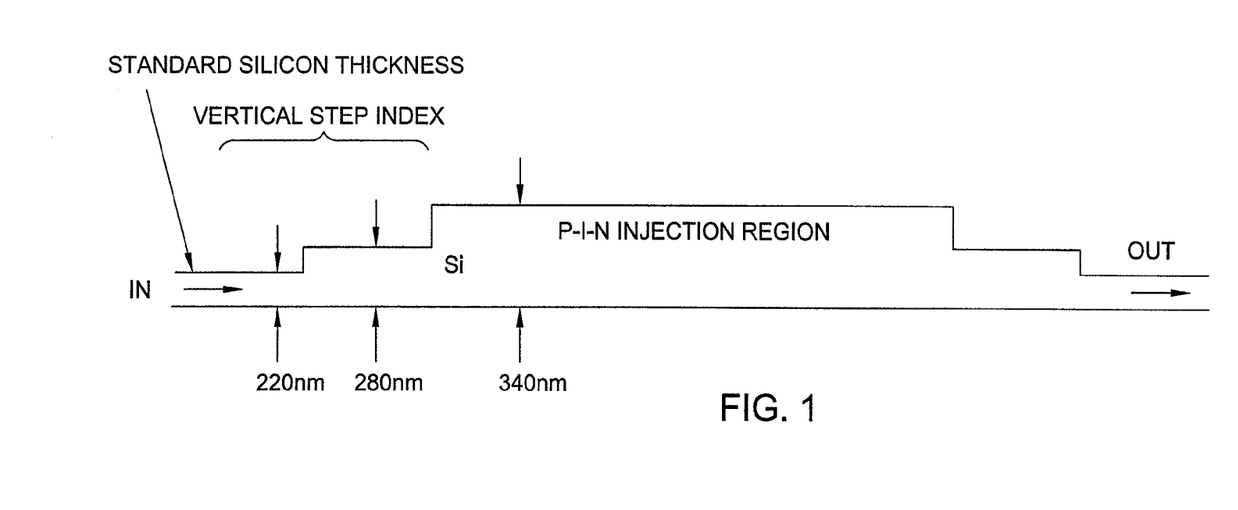
FIG. 1 depicts a side view of an optical waveguide apparatus according to one embodiment.

FIG. 1 depicts a side view of an optical waveguide apparatus according to one embodiment. Specifically, the apparatus comprises a substrate such as a silicon-on-insulator wafer (not shown) supports or otherwise has disposed upon it a waveguide of a standard thickness, illustratively 220 nm. It will be appreciated by those skilled in the art that other waveguide thicknesses may be used within the context of the present invention. For example, 100 nm waveguides are presently used in various applications. Theoretical limits for silicon waveguides indicate that thicknesses down to approximately 10 nm may also be employed, and such small geometry waveguides are also contemplated in various embodiments.

Referring to FIG. 1, an input optical signal IN is received by the waveguide at an input port (left side of figure) and propagated through the waveguide to provide an output optical signal OUT at an output port (right side of figure). The optical signal propagating through the waveguide is controllably attenuated via a P-I-N injection region (i.e., a P-I-N diode). The P-I-N injection region comprises regions on either side of the waveguide that are doped p-type and n-type to enable carriers to be injected into the waveguide. These carriers induce optical absorption, and hence, attenuation based on the bias current applied to the P-I-N diode structure. The P-I-N injection region is depicted as having a thickness of 340 nm. In one embodiment, the P-I-N injection region is epitaxially grown. In other embodiments, the P-I-N injection region is deposited as a poly-silicon layer.

To reduce optical losses due to modal mismatch between the thin silicon waveguide (~220 nm) and the P-I-N injection region (~340 nm), an optional additional waveguide segment having an intermediate thickness is added at both ends of the P-I-N injection region. The optional intermediate thickness waveguide segments act like semi-adiabatic tapers that help reducing optical transition losses between the various sections of the VOA. Specifically, first and second vertical step index regions having a thickness of 280 nm are optionally provided between the P-I-N injection region and, respectively, waveguide input and waveguide output. In various embodiments, the length of the index or tapering regions ranges from approximately 5 um to approximately 200 um. Larger or smaller index/tapering regions may be used depending upon the selected geometry and other considerations known to those skilled in the art and informed by the teachings provided herein. In some embodiments, multiple vertical steps are provided within the index/tapering regions. Generally speaking, the geometry, length, number of steps and so on is selected to reduce optical coupling losses between the waveguide (e.g., shown here as 220 nm) and the thicker PIN region (e.g., shown here as 340 nm).

One embodiment of the optical waveguide apparatus described above with respect to FIG. 1 comprises a highly confined optical waveguide made on a silicon-on-insulator wafer or substrate. The waveguide dimensions in one embodiment are approximately 550 nm wide and 220 nm thick, which provides for tight bending of the waveguide and minimization of the chip size and consequent cost. As previously noted, waveguides having different thicknesses may be used within the context of the present invention. In embodiments using different thickness waveguides, the thickness of the vertical step index regions and/or P-I-N injection region are adapted as would be known to those skilled in the art and informed by the teachings of the present specification. In various embodiments, the wafer or substrate may comprise an Indium-Phosphate substrate, a Lithium Niobate substrate or other substrate.

High optical confinement in narrow waveguides may result in a large VOA polarization dependence loss. This loss is acceptable for many applications where a VOA is used, such as, illustratively, at the output of a laser where the injected light is single polarization. However, for a more widely useful device the inventors have provided a substantially polarization independent design by adjusting the guiding region geometry at the P-I-N carrier injection region such that the modal profiles of the TE/TM polarization components are substantially identical. Specifically, a symmetrical nearly symmetrical waveguide geometry across the P-I-N junction is provided by, illustratively, epitaxially growing silicon on top of the P-I-N injection region.

Figure 2:
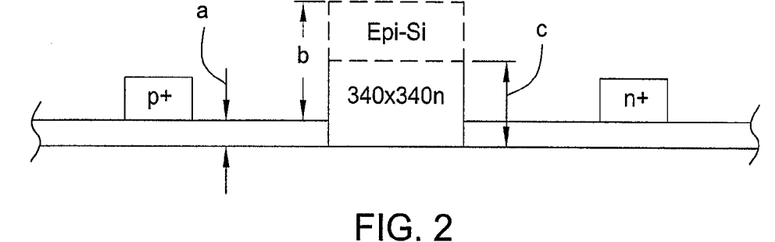
FIG. 2 depicts a cross sectional view of an optical waveguide according to one embodiment.

FIG. 2 depicts a cross sectional view of an optical waveguide according to one embodiment. Specifically, FIG. 2 depicts a cross sectional view of an optical waveguide such as discussed above with respect to FIG. 1 in which an additional 160 nm of epitaxially grown silicon (epi-silicon) is added to the guiding region which, illustratively, has a preselected width of 340 nm.

In various embodiments the epi-silicon region is formed as a layer disposed upon the P-I-N injection region or formed as part of the P-I-N injection region including the VOA. That is, the P-I-N injection region may be adapted to include the epi-silicon region. The transition region has a thickness that is intermediate the maximum and standard thicknesses. Referring to FIG. 1, a transition region having a thickness of 280 nm is depicted. This geometry is selected in this embodiment because 280 nm is between the 220 nm circuit photonic geometry of the waveguide and the 340 nm P-I-N injection region geometry.

In the case of thinner photonic geometries, the various embodiments are modified to reflect correspondingly thinner P-I-N injection region and epi-silicon (transition) region geometries. For example, if the waveguide is formed using a 110 nm geometry, the P-I-N injection region is formed using, illustratively, a 170 nm geometry and the epi-silicon (transition) region is formed using a 140 nm geometry. While the geometry in this embodiment reflects a 50% scaling of the FIG. 1 geometries, it will be appreciated by those skilled in the art and informed by the present disclosure that a simple scaling of geometry will not always be appropriate due to various physical and practical limitations, especially as photonic geometry approaches 10 nm.

Figure 3:
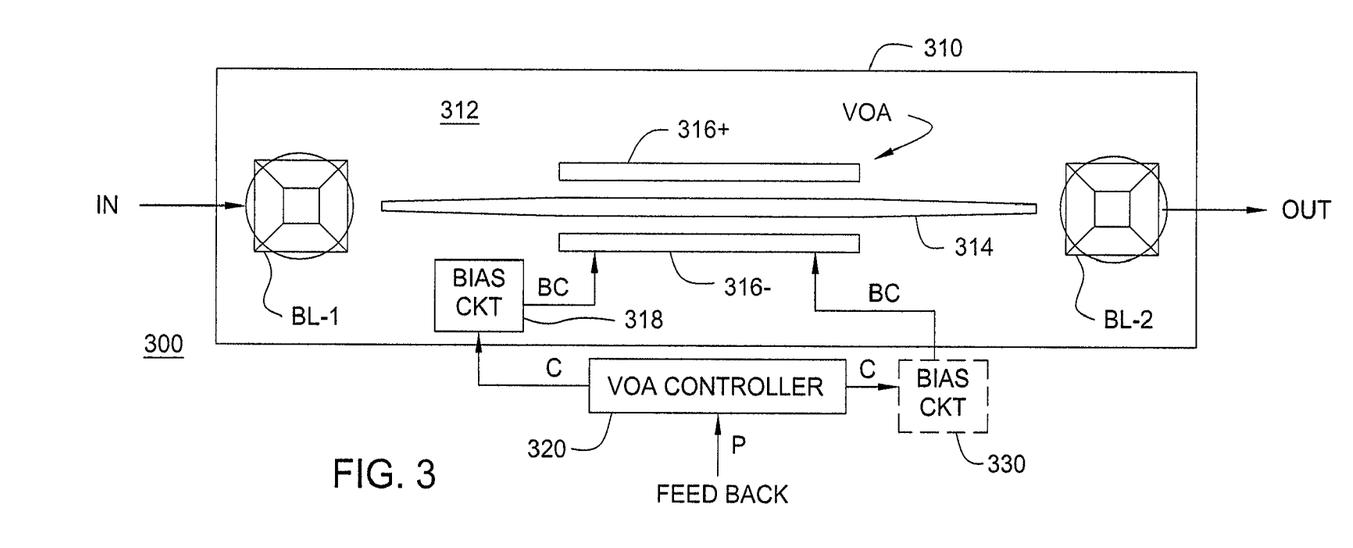
FIG. 3 depicts an optical waveguide apparatus according to one embodiment.

FIG. 3 depicts an optical waveguide apparatus according to one embodiment. Specifically, FIG. 3 depicts an optical waveguide apparatus 300 comprising a VOA chip 310, a VOA controller 320 and an optional off-chip bias circuit 330.

The VOA chip 310 comprises a substrate 312 having disposed thereon a waveguide 314, a VOA circuit or structure 316, an optional on-chip bias circuit 318, and trench structures adapted to receive an input ball lens BL-1 and an output ball lens BL-2. Advantageously, the use of a ball lens within the context of the present embodiment provides excellent coupling to connecting optical media, such as optical fibre, fibreoptic or silicon nanowires, lightpipes and so on. For example, coupling loss between an optical chip and a single mode optical fibre is about 3 to 4 dB using standard coupling techniques. It has been determined that coupling loss between an optical chip and a single mode optical fibre is about 0.5 to 1 dB using a ball lens.

The VOA chip 310 receives an input optical signal IN via the input ball lens BL-1. In operation, the input ball lens BL-1 is in optical communication with an optical fibre or other medium conveying the input optical signal IN. The input optical signal IN is conveyed by the input ball lens BL-1 to a first or proximate portion of the waveguide 314. The waveguide 314 propagates the optical signal from the input ball lens BL-1 two an output ball lens BL-2. The output ball lens BL-2 provides the propagated optical signal as an output optical signal OUT. In operation, the output ball lens BL-2 is in optical communication with an optical fibre or other medium conveying the output optical signal OUT.

The waveguide 314 is disposed between a p-type region 316+ and an n-type region 316− of the VOA 316. The VOA 316, in response to a bias current signal BC, operates to controllably inject carriers into the waveguide 314 such that attenuation of the optical signal passing through the waveguide 314 is achieved.

In one embodiment, the VOA chip 310 includes an on-chip bias circuit 318 that produces the bias current signal BC in response to a control signal received from the VOA controller 320. An alternate embodiment, the VOA chip 310 does not include an on-chip bias circuit 318. Rather, an external bias circuit 330 is used to provide the bias current signal BC to the VOA 316.

The VOA controller 320 provides the control signal to the bias circuit 318/330 in response to a feedback signal received from, illustratively, and optical power measuring/detection device (not shown). The VOA controller 320 operates to control the optical intensity within the waveguide such that the optical intensity is within a desired range, held constant, constrained from violating a high-power threshold and so on.

Figure 4:
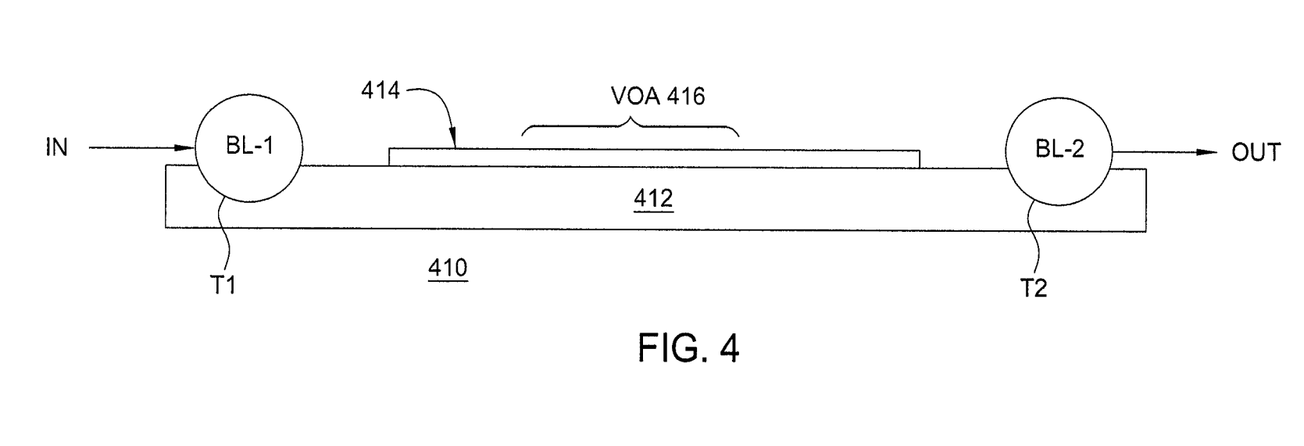
FIG. 4 depicts a side view of a VOA chip suitable for use in the optical waveguide apparatus of FIG. 3

FIG. 4 depicts a side view of a VOA chip suitable for use in the optical waveguide apparatus of FIG. 3. Specifically, FIG. 4 depicts a VOA chip 410 similar to the VOA chip 310 described above with respect to FIG. 3. Referring to FIG. 4, visible elements of the VOA chip 410 comprise a substrate 412, a waveguide 414, first ball lens BL-1 and second ball lens BL-2. It is also noted that the substrate 412 is formed with a first trench T1 adapted to receive first ball lens BL-1 and a second trench T2 to adapted to receive second ball lens BL-2. Various embodiments of the VOA chip depicted in FIG. 4 may be manufactured as an approximately 1 mm by 5 mm chip.

In various embodiments, the wafer or substrate further includes one or more power taps, such as integrated waveguide directional couplers or wavelength insensitive cascaded directional couplers adapted to sample or divert, illustratively, 2% to 5% of the optical power. In various embodiments, other technologies may be used (e.g., partially silvered mirrors and the like) and/or other amounts of optical power passing through the waveguide may be diverted (e.g., below 2% or above 5%). These embodiments also include one or more optical power detectors, such as PIN diode or integrated germanium or silicon germanium PIN detectors or other detector technologies adapted to detect an optical power level associated with the sampled or diverted optical signal portion(s). For example, waveguide power taps and detectors may be disposed on the substrate at the input and/or output of the VOA to provide feedback signals adapted for use by a controller to set VOA attenuation levels.

By using a high contrast waveguide design, the inventors have provided a waveguide circuit that may be "folded" so that a single imaging ball lens can be used to inject light into an input of a VOA chip or assembly, and also collect light emitted from an output of the VOA chip or assembly. In this manner, the very compact and low cost VOA design is provided which may be used within the context of a circuit pack or other apparatus. In another embodiment, two ball lenses are used on a single side of a chip or assembly for a package that has both input and output fibres on the same facet of the package, which embodiment is preferred for certain faceplate mounting configurations. The ball lens provides several advantages; namely, it is lower cost than a fibre v-groove assembly and it can provide improved optical coupling to various fibres. In various embodiments of the invention, optical input/output is provided by, illustratively, on chip mode converters, adiabatic tapers and the like.

Figure 5:
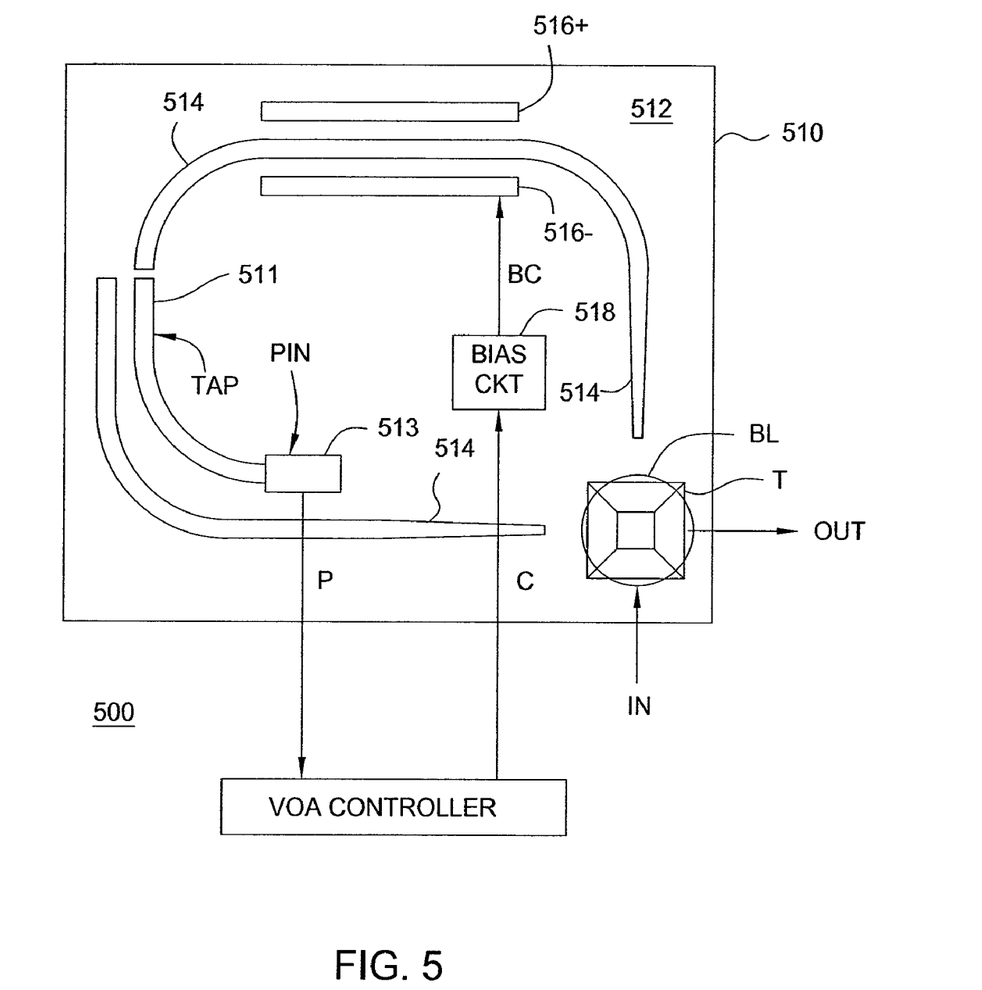
FIG. 5 depicts an optical waveguide apparatus according to another embodiment.

FIG. 5 depicts an optical waveguide apparatus according to another embodiment. Specifically, an optical waveguide apparatus 500 comprises a VOA chip 510 and a VOA controller 520. The VOA chip 510 comprises a substrate 512 including a trench T adapted to receive a ball lens BL. An input optical signal IN is received from an input port of the VOA chip 510 by the ball lens BL and coupled to a first or proximate portion of a waveguide 514. The waveguide 514 propagates the optical signal via several tight bends or folds (illustratively three) in the waveguide to a distal end of the waveguide, which is in communication with an output port via the ball lens BL. The ball lens BL propagates an optical output signal OUT to the output port and any subsequent optical transmission medium.

A portion of the waveguide 514 is disposed between a p-type region 516+ and an n-type region 516− of a VOA 516. A portion of the waveguide 514 optically communicates with a tap 511, which diverts a portion of the optical signal to a detector 513. The detector 513 generates a power signal P indicative of the power of the optical signal. The power signal P is provided to the VOA controller 520, which responsively generates a control signal C used to control a bias circuit 518. The bias circuit 518, in response to the control signal C, provides a bias control signal BC which is coupled to the VOA 516. The VOA 516, in response to the bias control signal BC, injects a proportionate number of carriers into the waveguide 514 to effect thereby a proportionate or controlled attenuation of the optical signal conveyed via the waveguide 514.

Thus, the optical waveguide apparatus of FIG. 5 provides a compact, low-cost VOA chip in which a single ball lens conveys input and output optical signal to a highly confined optical waveguide 514. The optical signal carried by the highly confined optical waveguide 514 is sampled and its power level detected such that appropriate adjustments in power level are made by controllably attenuating the optical signal using the VOA 516. In this manner, a VOA chip providing optical measurement and attenuation functions are provided on a single substrate.

Figure 6:
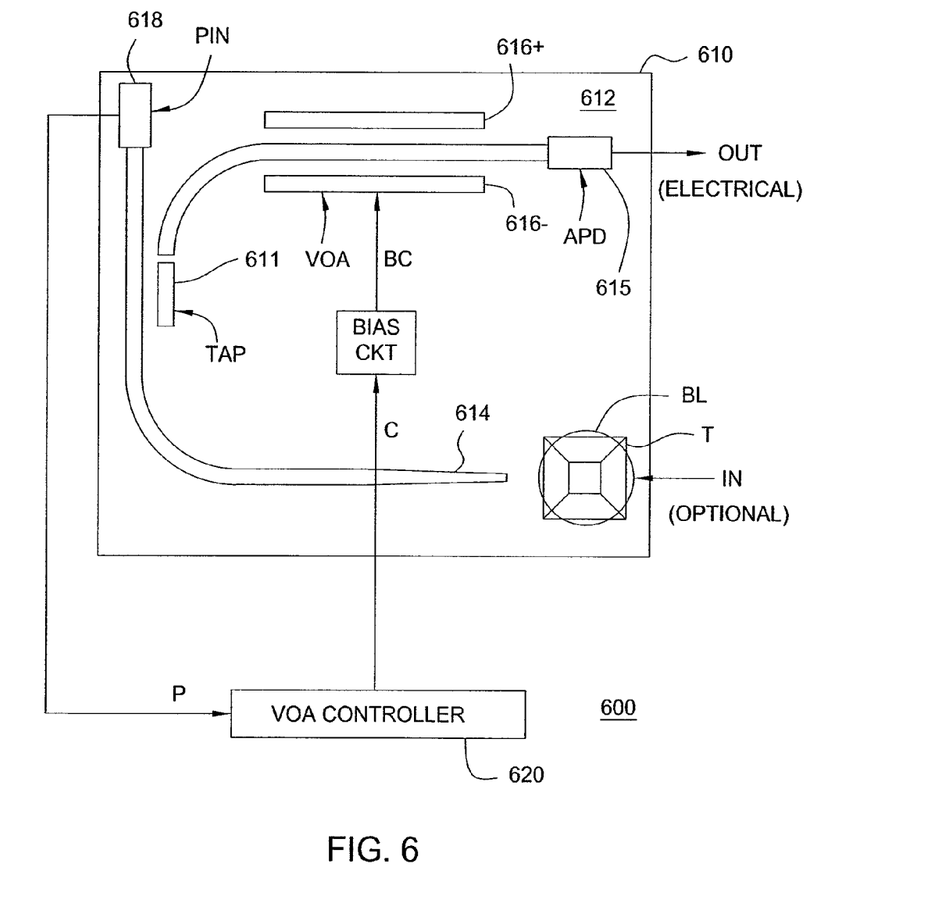
FIG. 6 depicts an avalanche photodiode (APD) receiver apparatus according to one embodiment.

FIG. 6 depicts an avalanche photodiode (APD) receiver apparatus according to one embodiment. Specifically, an APD receiver 600 comprises an APD receiver chip 610 and a VOA controller 620. The APD receiver chip 610 comprises a substrate 612 including a trench T adapted to receive a ball lens BL. An input optical signal IN is received from an input port of the VOA chip 610 by the ball lens BL and coupled to a first or proximate portion of a waveguide 614. The waveguide 614 propagates the optical signal back to an avalanche photodiode (APD) 615 via several tight bends or folds (illustratively two) in the waveguide 614. The APD provides an electrical output signal OUT in response to the optical signal provided via the waveguide 614. The output signal OUT is useful within the context of an optical receiver (i.e., the receiver apparatus of FIG. 6 finds particular utility within the context of a front end of a receiver).

A portion of the waveguide 614 is disposed between a p-type region 616+ and an n-type region 616− of a VOA 616. A portion of the waveguide 614 optically communicates with a tap 611, which diverts a portion of the optical signal to a detector 613. The detector 613 generates a power signal P indicative of the power of the optical signal. The power signal P is provided to the VOA controller 620, which responsively generates a control signal C used to control a bias circuit 618. The bias circuit 618, in response to the control signal C, provides a bias control signal BC which is coupled to the VOA 616. The VOA 616, in response to the bias control signal BC, injects a proportionate number of carriers into the waveguide 614 to effect thereby a proportionate or controlled attenuation of the optical signal conveyed via the waveguide 614. Thus, by controlling the VOA 616 the optical power of the signal provided to the APD 615 is controlled such that the APD is not damaged by an optical signal having the power level above an APD damage threshold level.

The inventors note that typical commercial receivers based on APDs require an external VOA outside and separate from the receiver package to prevent high input optical powers from damaging the sensitive APD. This requires an extra optical package, since the VOA is a micro-electromechanical device and the APD is, illustratively, an Indium Phosphate (InP) device and both are made in different materials usually by different vendors. The APD receiver apparatus of FIG. 6 combines a VOA, illustratively a polarization independent VOA, with a silicon APD such that the VOA and ADP functions may be monolithically integrated to thereby reduce cost. Furthermore since the silicon APD does not have an exposed junction, no hermetic package is required which will further reduce costs. In various embodiments, the wafer or substrate may comprise a silicon on insulator substrate, an Indium-Phosphate substrate, or other substrate.

Figure 7:
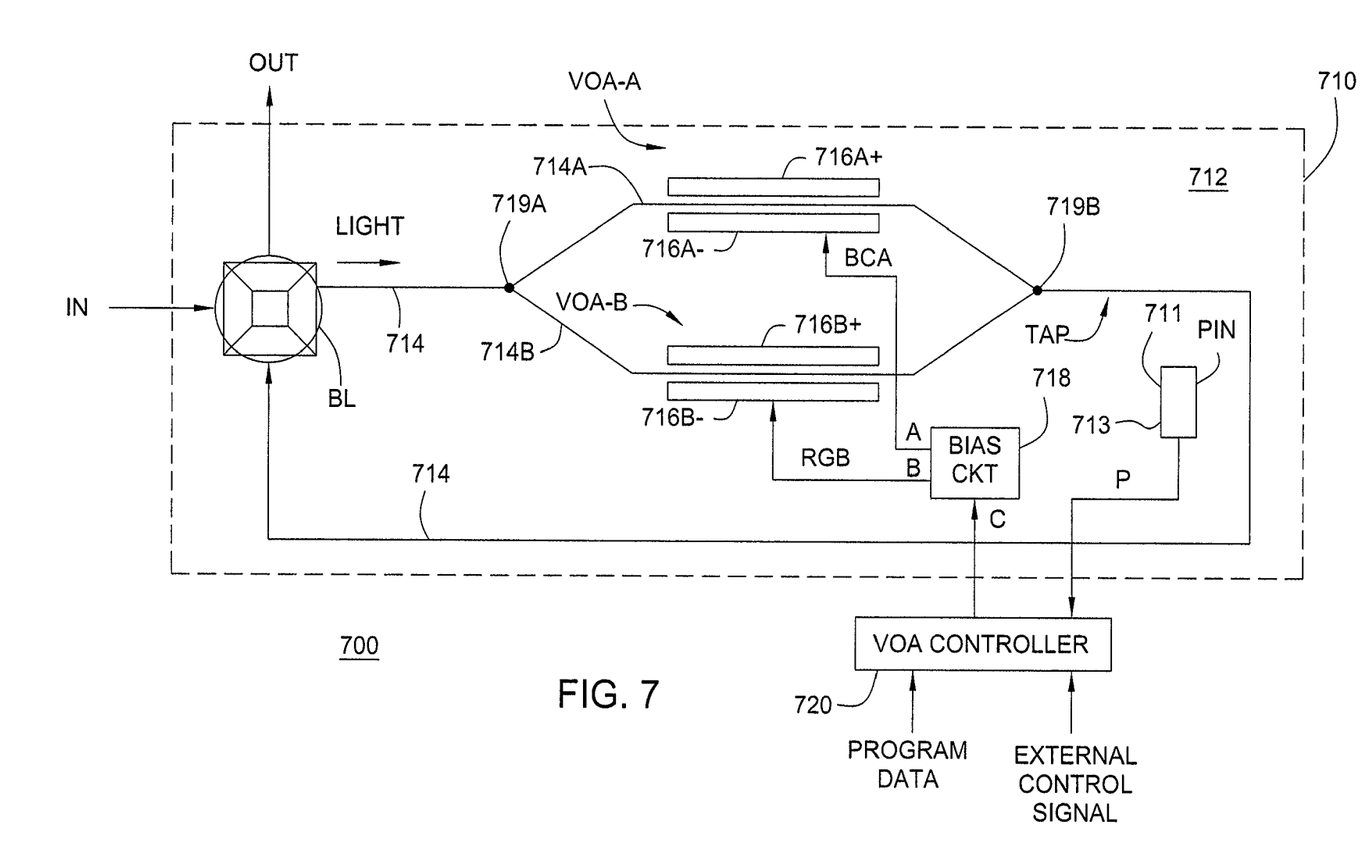
FIG. 7 depicts an optical waveguide apparatus according to another embodiment.

FIG. 7 depicts an optical waveguide apparatus according to another embodiment. Specifically, an optical waveguide apparatus 700 comprises a VOA chip 710 and a VOA controller 720. The VOA chip 710 comprises a substrate 712 including a trench T adapted to receive a ball lens BL.

An input optical signal IN is received by the ball lens BL from an input port of the VOA chip 710 and coupled to a first or proximate portion of a waveguide 714. The waveguide is adapted to form a Mach-Zehnder structure on the VOA chip 710. Specifically, the waveguide 714 is split into two Mach-Zehnder arms denoted as first arm 714A and second arm 714B at point 719 by, illustratively, an optical splitter. Each arm 714A and 714B of the Mach-Zehnder structure passes through (e.g., has disposed about it) structure implementing respective VOAs 716A and 716B, which are capable of imparting attenuation to the respective optical signal passing through the waveguide arm. Specifically, each arm 714A, 714B is disposed between a respective p-type region 716+ and a respective n-type region 716− of a respective VOA 716, which regions are controllably subjected to bias currents.

After the VOAs 716, the two waveguide arms 714A and 714B are coupled together at point 719B and the waveguide 714 propagates optical signal to a distal end of the waveguide, which is in communication with an output port via the ball lens BL. The ball lens BL propagates an optical output signal OUT to the output port and any subsequent optical transmission medium. As with the embodiments discussed above, the waveguide 714 propagates optical signal via several tight bends or folds (two, three or more) in the waveguide to provide thereby the optical output signal OUT.

A portion of the optical signal traversing the waveguide 714 is diverted by tap 711 and provided to a detector 713. The detector 713 generates a power signal P indicative of the power of the optical signal traversing the waveguide 714. The power signal P is provided to the VOA controller 720, which responsively generates a control signal C used to control a bias circuit 718. The bias circuit 718, in response to the control signal C, provides respective bias control signals BCA and BCB to the first 716A and second 716B VOAs. The first 716A and second 716B VOAs, in response to the respective bias control signals BCA and BCB, inject a proportionate number of carriers into the respective waveguide portions 714A and 714B to effect thereby a proportionate or controlled attenuation of the optical signal conveyed via the respective waveguide portions 714A and 714B.

The two VOAs 716A and 716B may be independently operated in forward bias and/or reverse bias mode. In a forward bias mode, the VOA 716 injects carriers into the P-I-N junction of the intrinsic region of its portion of the split waveguide 714, which thereby increases/initiates attenuation of the optical signal passing there through. In a reverse bias mode, the VOA 716 ceases to inject carriers into the P-I-N junction of the intrinsic region of its portion of the split waveguide 714, which thereby reduces/eliminates attenuation of the optical signal passing there through.

It is noted that in the reverse bias mode, carriers are moved across the P-I-N junction without generating significant currents. However, by moving the carriers across the P-I-N junction in reverse bias mode, the overlap between the optical mode and the location of the carriers is changed. This overlap parameter is controllably increased or decreased by changing the reverse bias current to provide thereby a change in phase of the optical signal traversing an arm. By reverse biasing both P-I-N junctions (i.e., controlling a reverse bias level of both VOA 716A and 716B), the phase of the optical signal through the two arms is changed without changing the resulting optical signal intensity at the output port.

The operation of the embodiments of FIG. 7 are different than the operation of the embodiments discussed above with respect to FIGS. 4-6. Specifically, in the FIGS. 4-6 embodiments the light intensity of a waveguide is directly modulated by injecting large carrier density into the intrinsic regions of the P-I-N junction. By contrast, the FIG. 7 embodiments utilize two VOAs within the context of a Mach-Zehnder structure to, in a reverse bias mode of operation, indirectly modulate intensity by modulating phase and optical mode.

The carrier injection process discussed above with respect to the VOAs of FIGS. 4-6 is relatively slow (e.g., ~500 MHz to ~1 GHz) compared to the reverse bias process discussed herein with respect to the VOAs of FIG. 7 (e.g., ~10 GHz to ~20 GHz). However, with a faster VOA comes a reduction in extinction ratio (i.e., attenuation ratio). Thus, in applications where speed is more critical than extinction ratio or attenuation level, the VOA discussed herein with respect to FIG. 7 is appropriate. Similarly, in applications where large extinction ratio or attenuation level is more critical than speed, the VOA discussed herein with respect to FIGS. 4-6 are appropriate.

Various embodiments described herein with respect to the various figures have been depicted as using an on-chip bias control circuit (e.g., 318, 418, 518, 618 and 718). While an internal (on-chip) bias circuit is likely to be a more efficient design, the bias circuit may also comprise an external (off-chip) circuit.

Various embodiments described herein with respect to the various figures have been depicted as using an external VOA controller (e.g., 320, 420, 520, 620 and 720) which provides a control signal C to an on-chip or off-chip bias circuit in response to optical power indicative signal. It will be appreciated that the VOA controllers described herein may be digital devices such as digital signal processors (DSPs), field programmable gate arrays (FPGAs), microprocessors or other computing elements/devices, analog processing elements and the like. Moreover, while depicted as being off-chip VOA controllers, it will be appreciated by those skilled in the art that the VOA controller function may be implemented on a VOA chip or APD receiver chip. Alternatively, such a chip may include upon the substrate a simple feedback loop adapted to keep optical power level below a threshold level, such as required within the context of an APD receiver.

A VOA controller may be preprogrammed or programmed via data received from an external computer or other device (not shown). Such programming may be used for both digital and analog VOA controllers. Generally speaking, in operation the VOA controller implements a bias control loop that adapted to maintain a constant optical signal power level at the waveguide output or chip output port.

It should be noted that, while only depicted with respect to the VOA controller 720 of FIG. 7, the external programming port (receiving the signal PROGRAM DATA) and its related functionality is optionally provided with any of the VOA controllers depicted in the other figures. Further, while only depicted with respect to the VOA controller 720 of FIG. 7, the external control signal port (receiving the signal EXTERNAL CONTROL SIGNAL) and its related functionality is optionally provided with any of the VOA controllers depicted in the other FIGs.

In one embodiment, the VOA controller includes a lookup table in which the level of a received signal indicative of waveguide optical power is mapped to an optical power profile (linear or nonlinear). In response to indication of a waveguide optical power level that is too high, too low, outside a desired range, or otherwise beyond a threshold level, the VOA controller adapts the signal provided to the bias control circuit such that the attenuation imparted by the VOA to the waveguide tends to bring the waveguide optical power to an appropriate or desired level. It is also noted that the control function is useful within the context of maintenance of optical networks where optical signal power may be reduced for safety reasons to allow workers to access certain system components without sustaining eye damage.

Generally speaking, a digital VOA controller may be implemented as a general purpose computer including memory, input/output means and a processor. Specifically, the various control functions are optionally implemented by a VOA controller configured as a computer program product wherein computer instructions, when processed by the computer, adapt the operation of the computer such that the methods and/or techniques described herein are invoked or otherwise provided. Instructions for invoking methods described herein may be stored in fixed or removable media and/or stored within a memory within a computing device operating according to the instructions. Also, at least portions of the instructions may be transmitted via a data stream in a broadcast or other signal bearing medium.

Although various embodiments which incorporate the teachings of the present invention have been shown and described in detail herein, those skilled in the art can readily devise many other varied embodiments that still incorporate these teachings.

What is claimed is:

1. A variable optical attenuator (VOA), comprising:
   a substrate, having disposed thereon a waveguide, including a trench structure adapted to receive a ball lens for optical communication between an input optical fibre and a proximate end of the waveguide, and for optical communication between a distal end of the waveguide and an output optical fibre;
   an epi-silicon region disposed upon the waveguide; and
   a carrier injection structure comprising a p-type region and an n-type region disposed about the waveguide and responsive to a bias current to controllably inject carriers into the waveguide to attenuate thereby optical signal propagating through the waveguide.

2. The VOA of claim 1, wherein the substrate further includes a tap for sampling optical signal passing through the waveguide, and a detector for generating a power representative signal in response to sampled optical signal received from the tap.

3. The VOA of claim 1, further comprising:
   a bias circuit adapted to provide said bias current in response to a control signal; and
   a controller, adapted to generate said control signal in response to said power representative signal.

4. The VOA of claim 3, wherein the bias circuit is disposed upon the substrate.

5. The VOA of claim 3, wherein the bias circuit is external to the substrate.

6. The VOA of claim 1, wherein the substrate further includes an avalanche photodiode (APD) positioned between the distal end of the waveguide and the ball lens.

7. The VOA of claim 6, wherein the bias current is adapted to constrain optical power levels in the waveguide to below a threshold level.

8. The VOA of claim 1, wherein:
   the waveguide comprises a Mach-Zehnder structure including two waveguide arms, each of the waveguide arms having disposed about it a p-type region and an n-type region responsive to a bias current to controllably inject carriers into the corresponding waveguide arm to attenuate thereby optical signal propagating through the waveguide arm.

9. The VOA of claim 8, wherein the bias currents controlling carrier injection into the two wavelength arm are operated in a forward bias mode to increase attenuation in the waveguide arms or in a reverse bias mode to decrease attenuation in the waveguide arms.

10. The VOA of claim 9, wherein the reverse bias mode of operation is adapted to controllably change a phase of an optical signal traversing a wavelength arm.

11. The VOA of claim 10, wherein the phase of an optical signal traversing a wavelength arm is changed by controllably increasing or decreasing an overlap parameter during a reverse bias mode of operation.

12. The VOA of claim 1, wherein the substrate comprises one of a silicon-on-insulator wafer and an Indium-Phosphate wafer.

13. The VOA of claim 1, wherein the waveguide is highly confined.

14. The VOA of claim 1, wherein the geometry of the epi-silicon region is selected to enable a polarization insensitivity to the apparatus, whereby the apparatus supports both TE and TM polarizations.

15. The VOA of claim 1, wherein the epi-silicon region is formed as a layer separated from the waveguide by a transition region.

16. The VOA of claim 1, wherein the epi-silicon region is formed as part of a P-I-N injection region including the VOA.

17. The VOA of claim 1, wherein the epi-silicon region is sized to reduce a polarization sensitivity characteristic of the highly confined waveguide.

18. The VOA of claim 1, further comprising a ball lens disposed upon the substrate.

19. The VOA of claim 12, wherein the waveguide is highly confined.

20. The VOA of claim 1, further comprising:
    a bias circuit adapted to provide said bias current in response to a bias control signal;
    a tap for sampling optical signal passing through the waveguide;
    a detector for generating a power representative signal in response to sampled optical signal received from the tap; and
    a controller for generating the bias control signal in response to the power representative signal, the controller adapting the bias control signal in response to waveguide optical signal power levels outside of a desired range.

21. The VOA of claim 20, wherein the bias circuit, tap and detector are disposed upon the substrate.

22. The VOA of claim 1, wherein the input optical fibre and output optical fibre comprise any of optical fibres, silicon nanowires, lightpipes, waveguides.

23. The VOA of claim 18, further comprising:
    a bias circuit adapted to provide said bias current in response to a bias control signal;
    a tap for sampling optical signal passing through the waveguide;
    a detector for generating a power representative signal in response to sampled optical signal received from the tap; and
    a controller for generating the bias control signal in response to the power representative signal, the controller adapting the bias control signal in response to waveguide optical signal power levels outside of a desired range.

* * * * *